(12) United States Patent
Dodard

(10) Patent No.: US 7,752,942 B2
(45) Date of Patent: Jul. 13, 2010

(54) STEERING WHEEL AND A METHOD FOR MANUFACTURING A STEERING WHEEL

(75) Inventor: Jérome Dodard, Poitiers (FR)

(73) Assignee: Autoliv Development AB, Vargarda (SE)

( * ) Notice: Subject to any disclaimer, the term of this patent is extended or adjusted under 35 U.S.C. 154(b) by 777 days.

(21) Appl. No.: 10/585,025

(22) PCT Filed: Nov. 15, 2004

(86) PCT No.: PCT/SE2004/001652

§ 371 (c)(1),
(2), (4) Date: Mar. 27, 2007

(87) PCT Pub. No.: WO2005/063545

PCT Pub. Date: Jul. 14, 2005

(65) Prior Publication Data

US 2007/0227291 A1    Oct. 4, 2007

(30) Foreign Application Priority Data

Dec. 31, 2003 (GB) .................................. 0330251.0

(51) Int. Cl.
*B62D 1/04* (2006.01)
(52) U.S. Cl. ....................................................... 74/552
(58) Field of Classification Search ................... 74/552
See application file for complete search history.

(56) References Cited

U.S. PATENT DOCUMENTS

| | | | |
|---|---|---|---|
| 2,943,164 A | 6/1960 | Kniffin, Jr. | |
| 3,331,260 A * | 7/1967 | Zeller | 74/552 |
| 3,876,844 A * | 4/1975 | Scherenberg | 200/61.57 |
| 5,228,362 A | 7/1993 | Chen et al. | |
| 5,901,615 A | 5/1999 | Itoh et al. | |
| 6,161,863 A | 12/2000 | Fujita et al. | |
| 6,213,502 B1 | 4/2001 | Ryan et al. | |
| 6,257,615 B1 | 7/2001 | Bohn et al. | |
| 6,312,012 B1 | 11/2001 | Bohn et al. | |
| 6,382,662 B1 | 5/2002 | Igawa | |
| 6,569,365 B1 | 5/2003 | Mizuno et al. | |
| 2001/0027698 A1 * | 10/2001 | Fleckenstein | 74/552 |
| 2001/0035631 A1 | 11/2001 | Hasebe | |
| 2001/0050473 A1 | 12/2001 | Fujita | |

FOREIGN PATENT DOCUMENTS

| | | |
|---|---|---|
| DE | 4314573 A1 * | 11/1994 |
| DE | 197 30 837 A1 | 1/1999 |
| DE | 19937539 A1 | 2/2001 |
| DE | 201 03 891 | 5/2002 |
| EP | 0 785 107 | 7/1997 |

(Continued)

*Primary Examiner*—Vicky A Johnson
(74) *Attorney, Agent, or Firm*—Brinks Hofer Gilson & Lione

(57) ABSTRACT

A steering wheel (1) has spokes (5) extending outwardly from a boss (3) to a rim (6). The rim has an inner frame (6) with an integrally moulded plastics coating (9) which has an internal cavity (11). The presence of the cavity minimises the overall weight of the steering wheel. The cavity is formed by initially injecting hot plastics material into a substantially vertical mould and subsequently blowing air into the lower part of the mould after some of the plastic adjacent the mould of walls has cooled.

12 Claims, 2 Drawing Sheets

FOREIGN PATENT DOCUMENTS

| | | |
|---|---|---|
| EP | 0 887 239 | 12/1998 |
| EP | 1 153 808 | 11/2001 |
| GB | 1365652 | 9/1974 |
| JP | 56-112361 | 9/1981 |
| JP | 5-31734 | 2/1993 |
| JP | 8-104238 | 8/1996 |
| JP | 9-277942 | 1/1998 |
| WO | WO 2004/005084 | 1/2004 |

* cited by examiner

STEERING WHEEL AND A METHOD FOR MANUFACTURING A STEERING WHEEL

CROSS REFERENCE TO RELATED APPLICATIONS

This application claims priority to Great Britain patent application number 0330251.0, filed Dec. 31, 2003 and PCT/SE2004/001652, filed Nov. 15, 2004.

1. FIELD OF THE INVENTION

The present invention relates to a steering wheel for a motor vehicle and a method of manufacturing a steering wheel for a motor vehicle.

BACKGROUND AND SUMMARY OF THE INVENTION

A typical automotive steering wheel has an inner frame formed of metal, the frame having a central portion or boss to be connected to a steering column and a plurality of spokes which extend radially outwardly from the boss to a peripheral rim. Typically the rim makes a full circle.

The frame is provided with a covering, which, in a prior proposed steering wheel, may comprise an inner core formed of polyurethane foam and an outer covering or skin formed of a plastics material such as a thermoplastic material. The polyurethane foam is light, but is a toxic material and, with present day technology, cannot be recycled.

A steering wheel must have specific dimensions, and the rim part of a steering wheel must have a dimension suitable for it to be readily grasped by hand.

The present invention seeks to provide an improved steering wheel in which polyurethane foam is not utilised but in which the weight of the steering wheel is maintained within an acceptable range.

According to a first aspect of the present invention, there is provided a steering wheel for a motor vehicle, the steering wheel having a metal frame, the metal frame defining a boss portion to be connected to a steering column, at least one spoke and a peripheral rim, at least the peripheral rim being provided with a surrounding integral plastics moulding, there being at least one cavity within the integral plastics moulding.

According to another aspect of this invention there is provided a steering wheel for a motor vehicle, the steering wheel having a metal frame, the metal frame defining a boss portion to be connected to a steering column, at least one spoke and a peripheral rim, at least the peripheral rim being provided with a surrounding integral plastics moulding, wherein there is a single closed cavity within the integral plastics moulding, the walls of the cavity being defined by the plastic moulding.

Advantageously, the rim of the frame is located at a position within the surrounding moulding which, when viewed in section, is such that the metal rim of the frame is off-set from the centre of the moulding.

Conveniently, the rim of the frame is provided with two orthogonal arms, the centre of gravity of the rim of the frame at any point being adjacent the centre of the moulding provided on the rim of the frame.

According to a further aspect of this invention there is provided a steering wheel for a motor vehicle, the steering wheel having a metal frame, the metal frame defining a boss portion to be connected to a steering column, at least one spoke and a peripheral rim, at least the peripheral rim being provided with a surrounding integral plastics moulding, wherein there is at least one cavity within the integral plastics moulding, and the peripheral rim includes a pair of orthogonal arms and is located at a position within the surrounding moulding which, when viewed in section, is off-set from the centre of the moulding.

Preferably, at least part of the moulding surrounding the rim is provided with a flexible over-moulding. Alternatively at least part of the rim is provided with a wood or leather outer sleeve.

According to another aspect of the present invention there is provided a method of making a steering wheel, the method comprising the steps of: preparing a mould defining a cavity to receive a frame for a steering wheel, the frame having a portion defining a boss to be secured to a steering column, at least one spoke and a rim connected to the spoke; the mould defining a mould cavity surrounding at least the rim, the mould cavity being provided with an injector arrangement to inject a molten plastics material and a propellant into part of the mould chamber to receive the rim of the steering wheel, the method further comprising the steps of: locating the mould in a force field, injecting plastics material into the mould at such a position, relative to the force field, that a predetermined part of the mould becomes filled with the plastics material; allowing the plastics material in contact with the surface of the mould to at least partially solidify; injecting a propellant into the mould cavity so that still molten plastics material spaced from the walls of the mould is driven into parts of the mould further from the injector arrangement; and permitting the thus driven plastics material to solidify on the walls of the mould, thus producing a steering wheel having an integral moulding surrounding the rim of the frame, with that integral moulding incorporating a chamber or cavity.

Preferably, the propellant is air. Alternatively, the propellant is another gas. In another alternative embodiment, the propellant is water.

Preferably, the injector arrangement is withdrawn from the cavity within the integral moulding and the cavity is sealed.

BRIEF DESCRIPTION OF THE DRAWINGS

In order that the invention may be more readily understood, and so that further features thereof may be appreciated, embodiments of the invention will now be described, by way of example, with reference to the accompanying drawings in which.

DETAILED DESCRIPTION OF THE INVENTION

Figure 1:
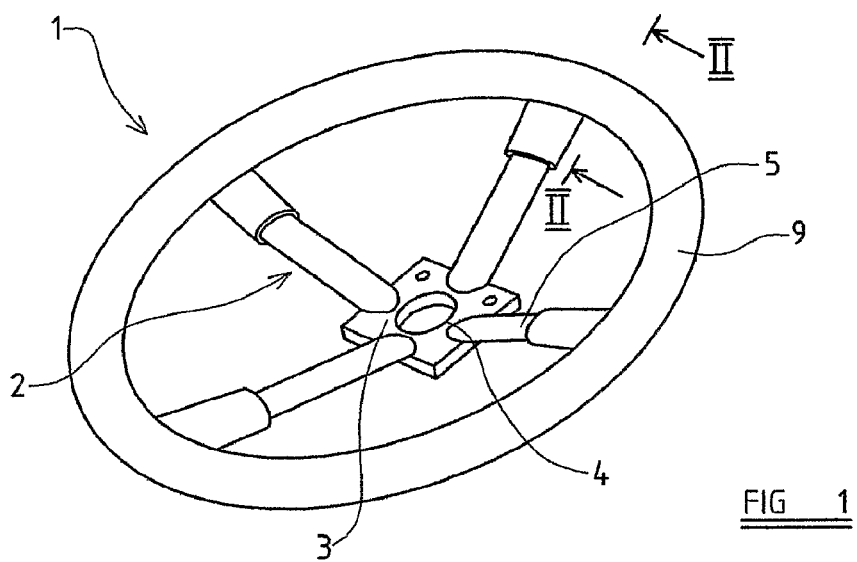
FIG. 1 is a perspective view of a steering wheel.

Referring initially to FIG. 1, a steering wheel 1 is provided with a frame 2 formed of metal, the frame 2 defining a central region or boss 3 which has an aperture 4 to secure the boss 3 to a steering column of a motor vehicle (not shown). A plurality of spokes 5 are provided which extend generally radially outwardly from the boss 3 of the steering wheel. The spokes 5 extend to a rim 6 (shown in more detail in FIG. 2). The rim 6 is of generally circular form and is mounted on each of the spokes 5. The rim 6 is formed of angle section having two arms 7, 8 extending at right angles to each other.

Figure 2:
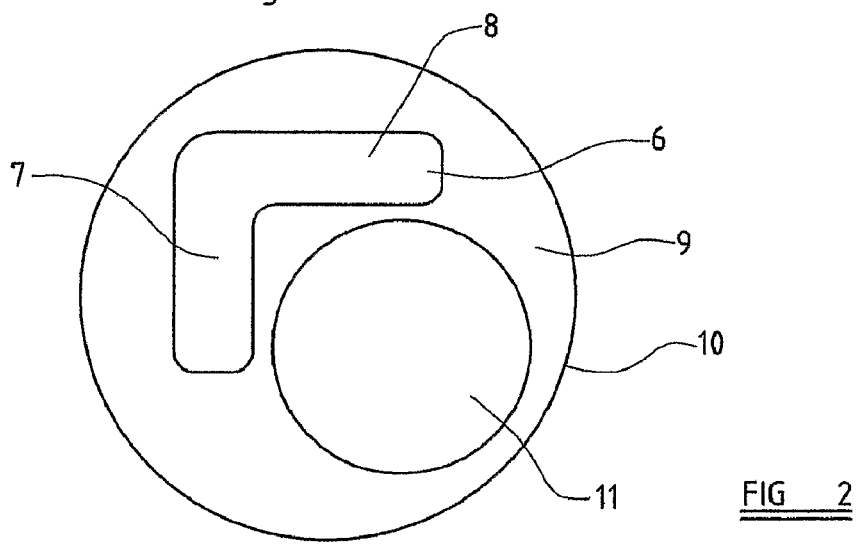
FIG. 2 is a sectional view taken on the line II-II of the steering wheel of FIG. 1.

The frame 2 has formed thereon an integrally plastics material moulding 9 which, in this embodiment, coats the rim 6 of the steering wheel and also the parts of the spokes 5 which are closest to the rim. The moulding 9 is of circular section when considered in a direction tangential to the rim, as can be seen in FIG. 2. The moulding 9 has a substantially circular exterior 10. Formed within the moulding 9 is a cavity 11, the cavity 11 being filled with air.

As can be understood from considering FIG. 2, the form of the rim 6 of the frame is such that the rim 6 is off-set from the centre of the moulding 9. The rim therefore does not obstruct a region which is located substantially centrally within the circular exterior 10 of the integral moulding 9. The cavity 11 occupies this space. The form of the rim 6, with the two orthogonally extending arms 7, 8 means that the effective centre of gravity of the rim is, however, at a point which is relatively close to the centre of the moulding 9, as considered in section, as shown in FIG. 2. The cavity 11 is positioned partially within a channel defined by the free ends of arms 7, 8.

The presence of the cavity 11 serves to minimise the overall weight of the steering wheel 1, but the steering wheel still has the desired external dimensions.

Figure 3:
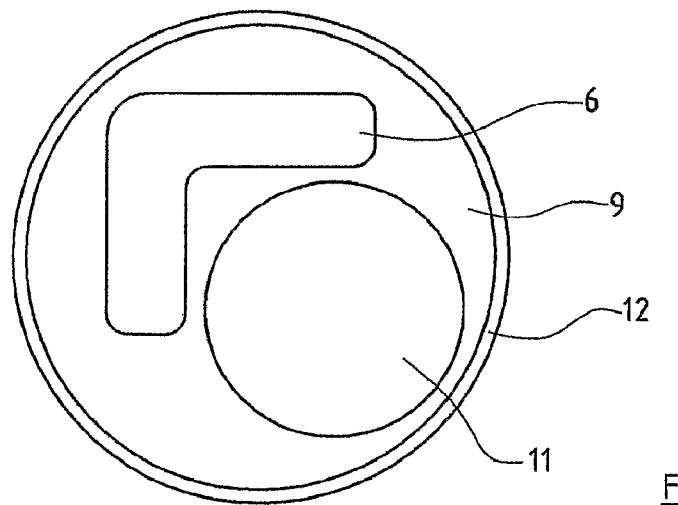
FIG. 3 is a view corresponding to FIG. 2 but illustrating a modified embodiment of the invention.

The integral moulding 9 may optionally be provided with an outer layer 12, as shown in FIG. 3, formed of a material that is relatively soft or pliable to provide the steering wheel with the appropriate "feel". Alternatively, the outer layer 12 covering the moulding 9 may be by an outer sleeve of leather or of wood (leather or wood outer sleeve is schematically shown as outer layer 12 in FIG. 3 for illustrative purposes only).

The cavity 11 may conveniently be created using a blow moulding technique.

Figure 4:
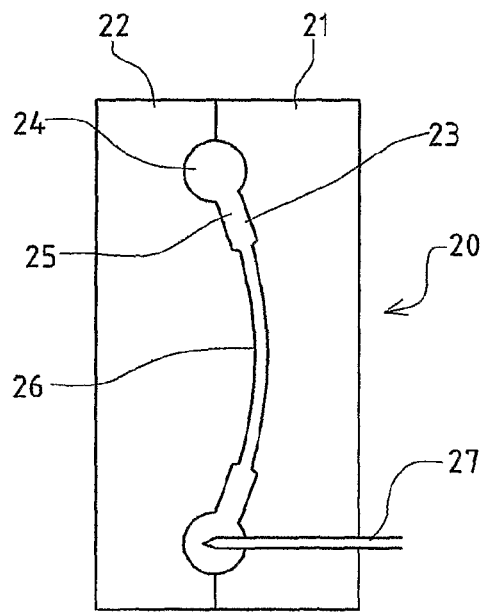
FIG. 4 is a sectional view taken through a mould utilised to form a steering wheel of the type shown in FIG. 1.
Figure 5:
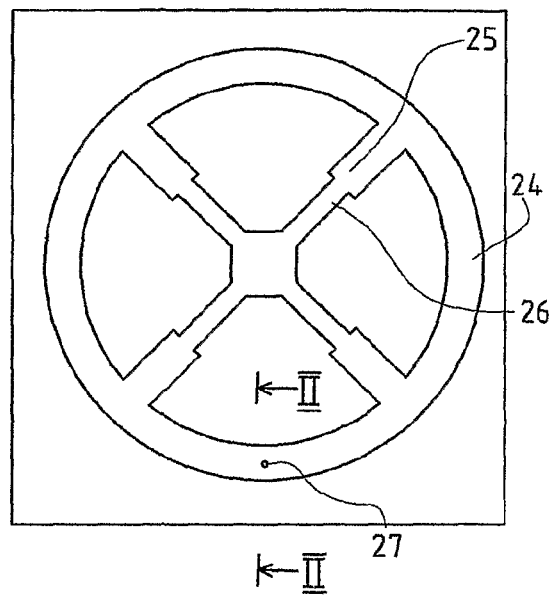
FIG. 5 is an elevational view of one part of the mould of FIG. 4.
Figure 6:
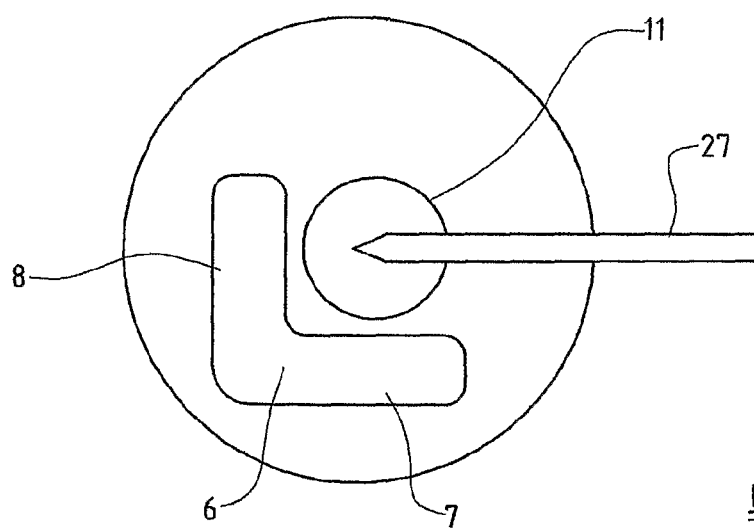
FIG. 6 is a sectional view taken on the line VI-VI of FIG. 5.

FIGS. 4 to 6 illustrate a mould 20 which may be utilised to form a steering wheel such as the steering wheel 1 of FIG. 1. The mould 20 comprises two co-operating mould parts 21, 22, although it is to be appreciated that in a modified embodiment of the invention a more complicated mould could be utilised. The two parts of the mould define a mould cavity 23. The mould cavity 23 defines a mould portion 24 in which the rim 6 of the steering wheel is to be moulded, a portion 25 in which the parts of the moulding which surround the spokes are to be moulded, and a portion 26 dimensioned to accommodate solely the frame 2 of the steering wheel. The mould 20 is designed to touch the frame 2 of the steering wheel relatively tightly so that a plastics material may be injected into the mould and will form the integral moulding 9, as desired, without providing any coating on the boss 3 of the frame 2 and without providing any coating on the parts of the spokes 5 which are closest to the boss 3.

At the lower-most part of the mould (i.e. at the "6-o'clock" position of the rim) a retractable injector 27 is preferably provided. A single injector may be provided to inject both a molten plastics material and a propellant of compressed gas, compressed air or even a liquid such as water under pressure, although in a modified embodiment of the invention a plurality of injectors may be provided.

In alternative embodiments the injector may be fixed in position, not being retractable, and may be on a terminal part of an appropriately positioned spoke.

The mould 20, in the preferred embodiment, is located at an appropriate orientation with regard to a surrounding force field which, in the described embodiment, is the force field of gravity. The mould is thus located in an upright position so that the injector 27 is located at the lower-most part of the portion 24 of the mould cavity 23 which is to form the rim of the steering wheel.

The frame 2 is located within the mould. The frame 2 may be spaced from certain parts of the mould by spacer elements. The spacer elements may be formed on the mould 20 or may be formed on the frame, or may be spacer elements which are inserted into the mould simultaneously with the frame.

Molten plastics material is injected into the lower part of the mould cavity 23 through the injector 27. The plastics material is injected into the cavity at a high temperature which may be in excess of 200° C. The plastics material may be injected such that the plastics material substantially half-fills the mould cavity 23. The plastics material closest to the walls of the mould will, because the walls of the mould are cold, begin to cool and will solidify to form a solidified "tube" of plastic adjacent the wall of the mould, whilst the plastics material spaced further from the wall will remain in a fluid condition. Thus, when a portion of the rim 6 of the steering wheel 1 is considered in cross-section, as in FIG. 2, the plastics material of the integral moulding 9 adjacent the periphery of the circular exterior 10 will be solidified whilst the plastics material in the central region, corresponding to the position of the cavity 11, will still be liquid or fluid.

A propellant in the form of a compressed air, compressed gas or even a fluid such as water may then be injected through the injector 27. The propellant will not displace the already partially solidified plastics material adjacent the walls of the mould, but will displace the still-molten plastics material which is not in contact with the walls of the mould. This material will thus be forced, as a slug of fluid material, through the mould cavity until the material emerges into the upper part of the mould cavity 23. The molten material will then come into contact with the walls of the mould forming the upper part of the mould cavity and will solidify when in contact with those walls, leaving the cavity 11 defined through the moulding 9.

When the moulding process is complete, the injector 27 is withdrawn from the cavity and the complete steering wheel 1 is removed from the cavity 23. If water was injected into the mould cavity as the propellant, the water will drain out of the steering wheel as it is removed from the mould, and the cavity 11 within the rim may then be sealed. If gas or air was used as the propellant, the cavity 11 may simply be sealed.

The resultant steering wheel 1 has a weight equivalent to the weight of a steering wheel fabricated using polyurethane foam. The steering wheel may be manufactured relatively cheaply and may be manufactured in many different designs. The steering wheel may be manufactured using only recyclable materials, and it may be possible to utilise the process of the invention with an overall cost reduction and an overall man power reduction.

In the preferred embodiment the force field of natural gravity is utilised. In a modified embodiment the mould could be placed on a centrifuge and the force field of centrifugal force could be utilised.

While the above description constitutes the preferred embodiment of the present invention, it will be appreciated that the invention is susceptible to modification, variation, and change without departing from the proper scope and fair meaning of the accompanying claims.

The invention claimed is:

1. The steering wheel for a motor vehicle comprising a metal frame, the metal frame defining a boss portion to be connected to a steering column, at least one spoke and a peripheral rim, at least the peripheral rim being provided with a surrounding integral plastic moulding, the moulding forming at least a single closed cavity within the moulding, the walls of the cavity being defined by the moulding, and the peripheral rim having a pair of orthogonal arms located at a position within the moulding which, when viewed in cross-section, is off-set from the center of the moulding.

2. A steering wheel according to claim 1 wherein at least part of the moulding surrounding the rim is provided with a flexible over-moulding.

3. A steering wheel according to claim 1 wherein at least part of the moulding surrounding the rim is provided with a wood or leather outer sleeve.

4. A steering wheel according to claim 1 wherein the rim and the cavity do not intersect.

5. A steering wheel for a motor vehicle comprising a metal frame, the metal frame defining a boss portion to be connected to a steering column, at least one spoke and a peripheral rim, at least the peripheral rim being provided with a surrounding integral plastic moulding, the moulding forming at least a single closed cavity within the moulding, the walls of the cavity being defined by the moulding, wherein the rim of the frame is provided with two orthogonal arms, the center of gravity of the rim of the frame being adjacent the center of the moulding when viewed in cross-section.

6. A steering wheel according to claim 5 wherein at least part of the moulding surrounding the rim is provided with a flexible over-moulding.

7. A steering wheel according to claim 5 wherein at least part of the moulding surrounding the rim is provided with a wood or leather outer sleeve.

8. A steering wheel according to claim 5 wherein the rim and the cavity do not intersect.

9. A steering wheel for a motor vehicle comprising a metal frame, the metal frame defining a boss portion to be connected to a steering column, at least one spoke and a peripheral rim, at least the peripheral rim being provided with a surrounding integral plastic moulding, the moulding forming at least a single closed cavity within the moulding, the walls of the cavity being defined by the moulding, wherein the rim and cavity do not intersect, and the cavity is positioned partially within a channel defined by free ends of the rim, when viewed in cross-section.

10. A steering wheel according to claim 9 wherein the rim of the frame is located at a position within the moulding which, when viewed in cross-section, is such that the metal rim of the frame is off-set from the center of the moulding.

11. A steering wheel according to claim 9 wherein at least part of the moulding surrounding the rim is provided with a flexible over-moulding.

12. A steering wheel according to claim 9 wherein at least part of the moulding surrounding the rim is provided with a wood or leather outer sleeve.

* * * * *